US012729146B2

(12) United States Patent
Parizot et al.

(10) Patent No.: US 12,729,146 B2
(45) Date of Patent: Sep. 8, 2026

(54) SYSTEM AND METHOD OF USING NANOBUBBLES IN A DEWATERING PROCESS FOR A LIQUID-SOLID STREAM

(71) Applicant: Moleaer, Inc., Hawthorne, CA (US)

(72) Inventors: Laureanne Marie Jeanne Parizot, Los Angeles, CA (US); Andrea Renee Turriciano White, Sparks, NV (US); John William Crisman, Eudora, KS (US)

(73) Assignee: Moleaer, Inc., Hawthorne, CA (US)

(*) Notice: Subject to any disclaimer, the term of this patent is extended or adjusted under 35 U.S.C. 154(b) by 0 days.

(21) Appl. No.: 19/365,960

(22) Filed: Oct. 22, 2025

(65) Prior Publication Data

US 2026/0145977 A1 May 28, 2026

Related U.S. Application Data

(60) Provisional application No. 63/725,623, filed on Nov. 27, 2024, provisional application No. 63/735,175,
(Continued)

(51) Int. Cl.
*C02F 11/14* (2019.01)
*C02F 1/52* (2023.01)
(Continued)

(52) U.S. Cl.
CPC .............. *C02F 11/143* (2019.01); *C02F 1/56* (2013.01); *C02F 11/121* (2013.01);
(Continued)

(58) Field of Classification Search
CPC ..... C02F 11/143; C02F 11/147; C02F 11/148; C02F 2103/28; C02F 2103/32;
(Continued)

(56) References Cited

U.S. PATENT DOCUMENTS 10,591,231 B2 3/2020 Russell et al.
10,598,447 B2 3/2020 Russell et al.
(Continued)

FOREIGN PATENT DOCUMENTS

CA 1116765 A 1/1982
CA 2795937 A1 * 6/2013 ................ C02F 1/56
(Continued)

OTHER PUBLICATIONS

Machine-generated English translation of CN 111747559, generated on Dec. 9, 2025.*
(Continued)

*Primary Examiner* — Fred Prince
(74) *Attorney, Agent, or Firm* — Fish & Richardson P.C.

(57) ABSTRACT

The present disclosure provides a dewatering method that includes combining water, a dewatering flocculant, and nanobubbles to form a dewatering composition. The method includes combining the dewatering composition with a solids-containing liquid stream to form a dewaterable composition. The method includes dewatering the dewaterable
(Continued)

composition to form a water stream and a dewatered product having a solids content that is greater than the solids content of the solids-containing liquid stream.

26 Claims, 3 Drawing Sheets

Related U.S. Application Data filed on Dec. 17, 2024, provisional application No. 63/757,550, filed on Feb. 12, 2025, provisional application No. 63/771,329, filed on Mar. 13, 2025.

(51) Int. Cl.

| | |
|---|---|
| ***C02F 1/56*** | (2023.01) |
| ***C02F 11/12*** | (2019.01) |
| ***C02F 11/121*** | (2019.01) |
| ***C02F 11/123*** | (2019.01) |
| ***C02F 11/127*** | (2019.01) |
| ***C02F 11/143*** | (2019.01) |
| ***C02F 11/147*** | (2019.01) |
| ***C02F 11/15*** | (2019.01) |
| *C02F 11/148* | (2019.01) |
| *C02F 103/28* | (2006.01) |
| *C02F 103/32* | (2006.01) |

(52) U.S. Cl.

CPC .......... *C02F 11/123* (2013.01); *C02F 11/127* (2013.01); *C02F 11/14* (2013.01); *C02F 11/147* (2019.01); *C02F 11/15* (2019.01); *C02F 1/52* (2013.01); *C02F 11/148* (2019.01); *C02F 2103/28* (2013.01); *C02F 2103/32* (2013.01); *C02F 2303/26* (2013.01)

(58) Field of Classification Search

CPC ....... C02F 11/56; C02F 11/121; C02F 11/123; C02F 11/127; C02F 11/15; C02F 1/52

USPC .................................................. 210/723, 728

See application file for complete search history.

(56) References Cited

U.S. PATENT DOCUMENTS

| | | | | |
|---|---|---|---|---|
| 2019/0233310 | A1* | 8/2019 | Mohler | C02F 1/34 |
| 2021/0220841 | A1* | 7/2021 | Carlos Gomes De Oliveira | C02F 11/008 |
| 2023/0091750 | A1* | 3/2023 | Vandeponseele | E21B 43/35 210/702 |

FOREIGN PATENT DOCUMENTS

| | | | | | |
|---|---|---|---|---|---|
| CN | 106186638 | A | * | 12/2016 | C02F 11/08 |
| CN | 111747559 | A | * | 10/2020 | C02F 1/24 |
| CN | 114292005 | A | * | 4/2022 | |
| CN | 217868251 | U | | 11/2022 | |
| CN | 115594383 | A | * | 1/2023 | C02F 11/147 |
| EP | 3747837 | A1 | * | 12/2020 | C08F 112/30 |
| KR | 100943813 | B1 | * | 2/2010 | C02F 1/24 |

OTHER PUBLICATIONS

Machine-generated English translation of CN 115594383, generated on Dec. 9, 2025.*

Machine-generated English translation of CN 106186638, generated on Dec. 9, 2025.*

Machine-generated English translation of CN 114292005, generated on Dec. 9, 2025.*

Machine-generated English translation of KR 100943813, generated on Dec. 9, 2025.*

U.S. Appl. No. 63/150,973, filed Feb. 18, 2021.

U.S. Appl. No. 16/818,217, filed Mar. 13, 2020.

International Search Report and Written Opinion in International Appln. No. PCT/US2025/052043, mailed on Jan. 13, 2026, 11 pages.

Lu et al., "Co-coagulation of micro-nano bubbles (MNBs) for enhanced drinking water treatment: A study on the efficiency and mechanism of a novel cleaning process," Water Research, Nov. 2022, 226:119245, 24 pages.

* cited by examiner

SYSTEM AND METHOD OF USING NANOBUBBLES IN A DEWATERING PROCESS FOR A LIQUID-SOLID STREAM

CLAIM OF PRIORITY

This application claims priority to U.S. Provisional Application Ser. No. 63/725,623 filed on Nov. 27, 2024; U.S. Provisional Application Ser. No. 63/735,175 filed Dec. 17, 2024, U.S. Provisional Application Ser. No. 63/757,550 filed Feb. 12, 2025, and U.S. Provisional Application Ser. No. 63/771,329 filed Mar. 13, 2025. The entire contents of which are hereby incorporated by reference.

TECHNICAL FIELD

Embodiments of this disclosure generally relate to dewatering a liquid-solid mixture. More specifically, embodiments of this disclosure relate to a system and method of using nanobubbles in a dewatering process for a liquid-solid stream.

BACKGROUND

Dewatering is the process of removing water from a liquid-solid stream (e.g., sludge). Dewatering may be used to reduce the weight of a material, reduce hauling costs, avoid challenges of handling liquid like leaks, and to allow further transformation of the liquid-solid mixture like drying and composting. Sludge is a mixture of water and solids resulting in a semi-solid material. The dewatering process includes extracting the liquid from the liquid-solid stream to produce a concentrated solid material. The concentrated solid material can be further treated or used in various ways depending on the industrial process involving dewatering (e.g., disposal, compost, paper or fruit pulp, etc.).

SUMMARY

Aspects of the present disclosure provide a method that includes combining a liquid, a liquid-removing flocculant, and nanobubbles to form a first composition. The method includes combining the first composition with a solids-containing liquid to form a second composition. The method includes removing liquid from the second composition to form a liquid stream and a product having a solids content that is greater than the solids content of the solids-containing liquid stream. As used herein, the term "liquid-removing flocculant" includes both flocculants (e.g., polymers) and coagulants (e.g., salts).

Aspects of the present disclosure provide a dewatering method. The dewatering method includes combining water, a dewatering flocculant, and nanobubbles to form a dewatering composition. The method includes combining the dewatering composition with a solids-containing liquid stream to form a dewaterable composition. The method includes dewatering the dewaterable composition to form a water stream and a dewatered product having a solids content that is greater than the solids content of the solids-containing liquid stream. As used herein, the term "dewatering flocculant" includes both flocculants (e.g., polymers) and coagulants (e.g., salts).

In some embodiments, the solids-containing liquid stream comprises a biomass stream. In some embodiments, the solids-containing liquid stream is a sludge stream selected from the group consisting of wastewater sludge, oily sludge, mineral sludge, natural sludge, ash sludge, and combinations thereof. In some embodiments, the solids-containing liquid stream is a pulp stream selected from the group consisting of paper pulp, food pulp, and combinations thereof. In some embodiments, the solids-containing liquid stream has a solids content of at least 0.5 g/L, at least 1.0 g/L, at least 1.5 g/L, at least 2.5 g/L, at least 5 g/L, at least 7 g/L, or at least 10 g/L.

In some embodiments, the dewatering flocculant comprises a dewatering polymer. In some embodiments, the dewatering flocculant comprises a cationic polymer. In some embodiments, the dewatering polymer is selected from the group consisting of polyacrylamide, polyethyleneamine, polyethyleneimine, cationic starch, melamine-formaldehyde polymer, polyamine, and combinations thereof. In some embodiments, the dewatering flocculant includes lime, iron salt, aluminum salt, or a combination thereof.

In some embodiments, the nanobubble concentration in the dewatering composition is at least $1\times10^6$ nanobubbles/mL.

Aspects of the present disclosure provide a system. The system includes a blending apparatus configured to receive water, a dewatering flocculant, and nanobubbles, where the blending apparatus is configured to combine the water, the dewatering flocculant, and the nanobubbles to form a dewatering composition. The system includes a second apparatus that is configured to receive a solids-containing liquid stream and the dewatering composition, where the solids-containing liquid stream, where the second apparatus is configured to combine the solids-containing liquid stream and the dewatering composition to form a dewaterable composition. The system includes a dewatering unit configured to receive the dewaterable composition, where the dewatering unit is configured to dewater the dewaterable composition to form a water stream and a dewatered product having a solids content that is greater than the solids content of the solids-containing liquid stream.

In some embodiments, the system further includes a nanobubble generator configured to receive the water prior to entering the blending apparatus, where the nanobubble generator is configured to generate the nanobubbles and incorporate the nanobubbles into the water. In some embodiments, the blending apparatus is configured to receive the water and the nanobubbles from the nanobubble generator. In some embodiments, the dewatering unit is selected from the group consisting of a clarifier, a gravity belt thickener, a rotary drum thickener, a dissolved air flotation system, a filtration system, a centrifuge, a belt filter press, a frame filter press, a screw press, any gravity-based dewatering unit, and a combination thereof.

In some embodiments, the second apparatus receives the solids-containing liquid stream where the solids-containing liquid stream comprises a biomass stream. In some embodiments, the second apparatus receives the solids-containing liquid stream where the solids-containing liquid stream comprises a sludge stream. In some embodiments, the sludge stream is selected from the group consisting of wastewater sludge, oily sludge, mineral sludge, natural sludge, ash sludge, and combinations thereof.

In some embodiments, the second apparatus receives the solids-containing liquid stream, where the solids-containing liquid stream comprises a pulp stream. In some embodiments, the pulp stream is selected from the group consisting of paper pulp, food pulp, and combinations thereof. In some embodiments, the solids-containing liquid stream has a solids content of at least 0.5 g/L, at least 1.0 g/L, at least 1.5 g/L, at least 2.5 g/L, at least 5 g/L, at least 7 g/L, or at least 10 g/L.

In some embodiments, the second apparatus receives the dewatering composition, where the dewatering flocculant in the dewatering composition comprises a dewatering polymer. In some embodiments, the dewatering polymer comprises a cationic polymer. In some embodiments, the dewatering polymer is selected from the group consisting of polyacrylamide, polyethyleneamine, polyethyleneimine, cationic starch, melamine-formaldehyde polymer, polyamine, and combinations thereof. In some embodiments, the dewatering flocculant includes lime, iron salt, aluminum salt, or a combination thereof.

In some embodiments, the nanobubble concentration in the dewatering composition is at least $1\times10^6$ nanobubbles/mL.

Other features and advantages of the disclosure will be apparent from the following detailed description, and from the claims.

BRIEF DESCRIPTION OF DRAWINGS

Like reference numbers and designations in the various drawings indicate like elements.

DETAILED DESCRIPTION

Figure 1:
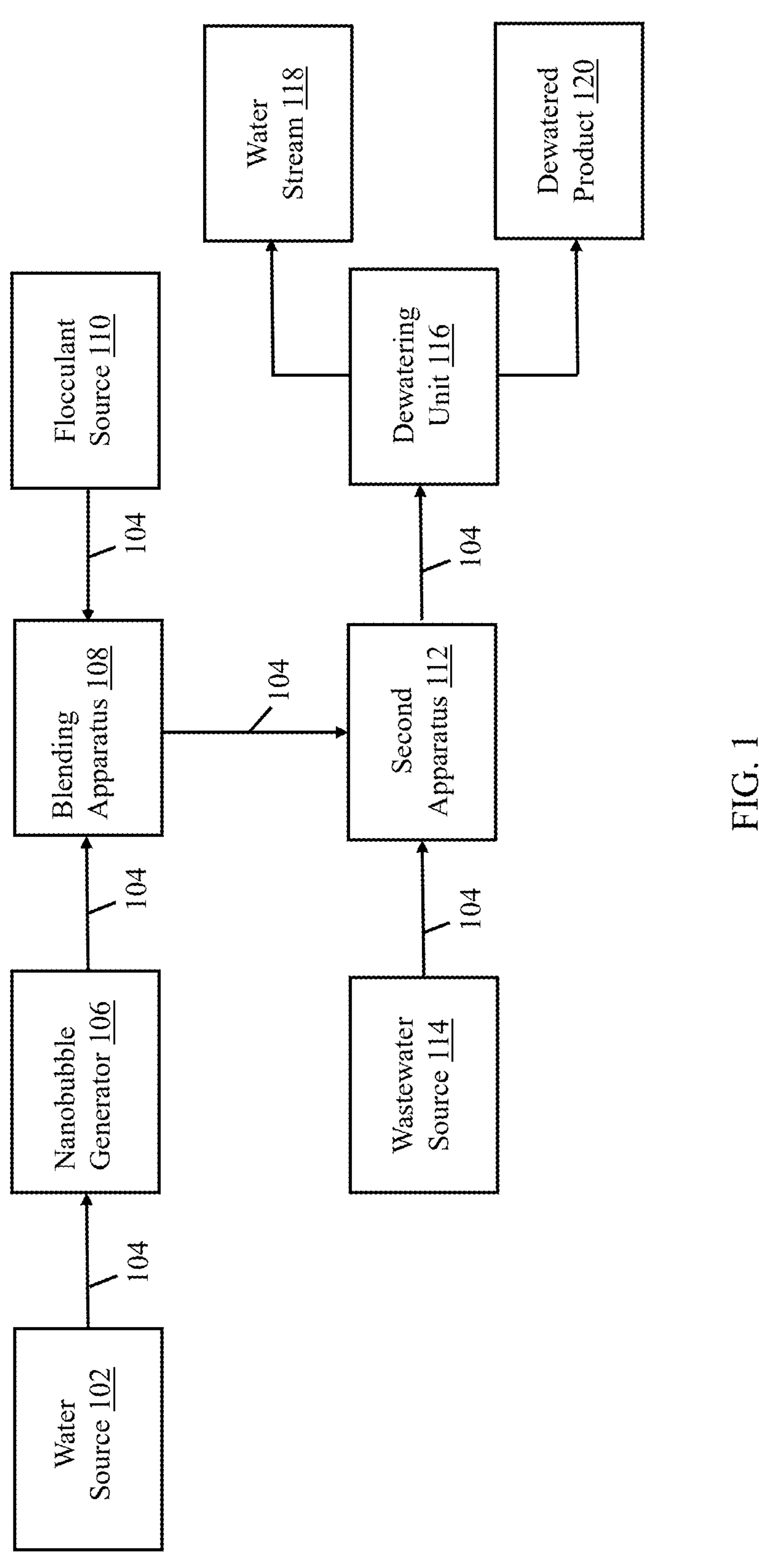
FIG. 1 shows a schematic illustration of a system.

The systems and methods described herein are directed to using nanobubbles in a dewatering process for a liquid-solid stream. These approaches provide practical applications and technical advantages that address various problems associated with introducing nanobubbles into a dewatering process. For example, one technical problem associated with passing a liquid-solid stream having a high solids content (e.g., sludge) directly through a nanobubble generator is that such a system of producing nanobubbles in this context would be subject to clogging and fouling, making stable operations difficult. Attempts at an effective maintenance regime for such a system configured to directly inject nanobubbles into a liquid-solid stream having a high solids content would likely be overwhelming and therefore not cost-effective. A second technical challenge is that introducing an additional composition containing a second volume of water and nanobubbles into the dewatering process would dilute the stream to be dewatered and thus runs counter to the objectives of the dewatering process.

A third technical challenge is that the liquid-solid stream is often specific for each site and is complex. For example, the liquid-solid stream can be composed of different types of solids like minerals, organics, oil, volatile solids, bacteria, fibers, and may change over time. To address this, a concentrated dewatering flocculant tailored to the specific liquid-solid stream may be diluted and added to improve dewatering performance. Thus, dewatering processes often change the type of dewatering flocculant used to optimize dewatering, depending on the composition of the liquid-solid stream. However, flocculant can be expensive depending on the type of the liquid-solid stream. Reducing the amount of flocculant used for dewatering is beneficial, as it lowers the cost associated with the dewatering process. A fourth technical problem is that hauling the dewatered cake can be expensive. Any improvement in reducing the weight of the dewatered cake (i.e., improved removal of water in the dewatering process) lowers the cost of the dewatering process.

Embodiments of the present disclosure address the aforementioned technical problems, in part, by combining nanobubbles with water and a dewatering flocculant to form a dewatering composition prior to combining the dewatering composition with a solids-containing liquid stream (e.g., sludge) to form a dewaterable composition. By combining the nanobubbles with water during dilution of the concentrated dewatering flocculant, one can avoid the drawbacks associated with directly injecting nanobubbles into the solids-containing liquid stream, which as mentioned above, can lead to clogging and fouling. This obfuscates any need for expanded engineering of a nanobubble generator designed for direct injection to the solids-containing liquid stream, as well as intensive, unfeasible maintenance and cleaning regimes. Additionally, aside from the water used to dilute the dewatering flocculant, no additional water needs to be added which would run counter to the dewatering process. Further, the flowrate of water used to dilute the dewatering flocculant is relatively low, so a small nanobubble generator may be used to dilute the dewatering flocculant, thereby keeping capital costs low. Finally, incorporating nanobubbles into the dewatering process in this way surprisingly and unexpectedly improves filtration time, lowers turbidity of the filtered water, and lowers the Total Suspended Solid (TSS) in the filtered water. Additionally, surprisingly and unexpectedly, when the nanobubbles are incorporated into the dewatering process during the dewatering flocculant dilution stage as compared to directly injecting the nanobubbles into the liquid-solid stream, significantly less nanobubbles (e.g., at least an order of magnitude less) can be used via incorporating the nanobubbles during the dewatering flocculant dilution stage compared to directly injecting the nanobubbles into the liquid-solid stream while achieving similar results, as will be detailed below. These improvements may lower the amount of dewatering flocculant needed during the dewatering process, and yield dewatered cakes with lower water content, thereby lowering costs associated with the dewatering process.

FIG. 1 shows an example system 100 for dewatering. The system 100 includes a water source 102, a nanobubble generator 106, a blending apparatus 108, a flocculant source 110, a second apparatus 112, a wastewater source 114, a dewatering unit 116, a water stream 118, a dewatered product 120, and fluid conduit(s) 104 that place the various components of the system 100 in fluid communication, as will be detailed below.

The nanobubble generator 106 receives water from the water source 102 via the fluid conduit 104. In some embodiments, the water source 102 may include, but is not limited to, tap water, natural water, or recycled water from an industrial process or secondary wastewater treatment. A pump (not shown) may be used to transport the water from the water source 102 to the nanobubble generator 106. The nanobubble generator 106 generates the nanobubbles in the water received from the water source 102. In some embodiments, the nanobubble generator 106 is configured to generate nanobubbles having a mean bubble size from at least 50 nm, at least 100 nm, at least 150 nm, to no greater than 200 nm, no greater than 250 nm, no greater than 500 nm, no greater than 750 nm, or no greater than 1000 nm. In some embodiments, the nanobubble generator 106 is configured to generate nanobubbles having a zeta potential of at least −5 mV, at least −10 mV, at least −15 mV, at least −20 mV, at least −25 mV, at least −30 mV, at least −35 mV, at least −40 mV, at least −50 mV, at least −60 mV, to no greater than −70 mV, no greater than −80 mV, no greater than −90 mV, or no greater than −100 mV. Any suitable gas may be injected into the nanobubble generator 106, which may include but is not limited to air, oxygen, nitrogen, hydrogen, carbon dioxide, argon, or combinations thereof. A variety of nanobubble generators 106 can be used to produce the water and the nanobubble stream. Suitable nanobubble generators 106 are described in U.S. Pat. Nos. 10,591,231 and 10,598,447, U.S. Ser. Nos. 16/818,217, or 63/150,973, each of which is incorporated by reference herein.

The blending apparatus 108 receives the water containing nanobubbles from the nanobubble generator 106 via the fluid conduit 104 and receives dewatering flocculant via the fluid conduit 104 from the flocculant source 110. The nanobubble-containing water and the dewatering flocculant are combined in the blending apparatus to form a dewatering composition. In some embodiments, the blending apparatus 108 includes components to facilitate mixing which may include, but are not limited to pumps, static or dynamic mixers. The blending apparatus 108 may be any suitable vessel for combining the nanobubble-containing water and the dewatering flocculant, which may include, but is not limited to a mixing tank, a resting tank, or a conduit. The blending apparatus 108 may combine the nanobubble-containing water and the dewatering flocculant in a continuous operation or in a batch operation.

In some embodiments, the dewatering flocculant includes a dewatering polymer, such as a cationic polymer, an anionic polymer, a non-ionic polymer, a zwitterionic polymer, or a combination thereof. In some embodiments, the dewatering polymer includes polyacrylamide, polyethyleneamine, polyethyleneimine, cationic starch, melamine-formaldehyde polymer, polyamine, or combinations thereof. In some embodiments, the dewatering flocculant includes lime, iron salt, aluminum salt, or a combination thereof.

In some embodiments, the nanobubble concentration in the dewatering composition is at least $1\times10^6$ nanobubbles/mL, at least $1\times10^7$ nanobubbles/mL, at least $1\times10^8$ nanobubbles/mL, at least $1\times10^9$ nanobubbles/mL, at least $1\times10^{10}$ nanobubbles/mL, or at least $1\times10^{11}$ nanobubbles/mL. In some embodiments, the nanobubble concentration ranges from $1\times10^6$ nanobubbles/mL to $1\times10^{11}$ nanobubbles/mL.

The second apparatus 112 receives the nanobubble-containing dewatering composition from the blending apparatus 108. The second apparatus 112 also receives a solids-containing liquid stream from a wastewater source 114. Pumps (not shown) may be configured to transport the dewatering composition and the solids-containing liquid stream to the second apparatus 112. The second apparatus 112 combines the dewatering composition and the solids-containing liquid stream to form a dewaterable composition. The second apparatus 112 may be any suitable vessel for combining the dewatering composition and the solids-containing liquid stream, which may include, but is not limited to a mixing tank, a conduit, or a well. In some embodiments, the second apparatus 112 includes components to facilitate mixing which may include, but are not limited to static or dynamic mixers. The second apparatus 112 may combine the solids-containing liquid stream and the dewaterable composition in a continuous operation or in a batch operation.

In some embodiments, the solids-containing liquid stream has a solids content from at least 0.5 g/L, at least 1.0 g/L, at least 1.5 g/L, at least 2.5 g/L, at least 5 g/L, at least 7g/L, at least 10 g/L, at least 15 g/L, at least 20 g/L, at least 25 g/L, at least 30 g/L, at least 35 g/L, at least 40 g/L, to at most 45 g/L, at most 50 g/L, at most 55 g/L, or at most 60 g/L.

In some embodiments, the solids-containing liquid stream is a biomass stream. In some embodiments, the solids-containing liquid stream is a pulp stream. For example, the pulp stream may include, but is not limited to, paper pulp, food pulp, or a combination thereof. In some embodiments, the solids-containing liquid stream is a sludge stream. The sludge stream may include, but is not limited to wastewater sludge, oily sludge, mineral sludge, natural sludge, ash sludge, or combinations thereof. As used herein, "wastewater sludge" may include primary sludge from the settling process in municipal or industrial wastewater treatment; biological sludge made of a mixture of microorganisms from the biological treatment of wastewater (e.g., biological sludge comprises a mixture of microorganism, such as bacterial that amalgamate in bacterial flocs through the synthesis of exo-polymers); digested sludge, which is the product of biological stabilizing called digestion that is performed on biological or mixed sludge; and physico-chemical sludge produced by physico-chemical treatment of wastewater. It is composed of flocs produced by a chemical treatment (coagulants and/or flocculants).

As used herein, "mineral sludge" refers to sludge produced during mineral processes such as drilling, quarries, or mining beneficiation processes. Their nature is essentially mineral particles of various sizes (including clays). As used herein, "oily sludge" refers to sludge in which oil is disposed. It may be produced from oil separation processes such as recycling or extraction. As used herein, "natural sludge" refers to sludge found in waterway silt (e.g., rivers or streams). As used herein, "ash sludge" refers to sludge produced when washing coal after energy production.

In some embodiments, the dewatering flocculant is present in the dewaterable composition in an amount from at least 0.01 wt. %, at least 0.1 wt. %, at least 1 wt. %, at least 2 wt. %, at least 3 wt. %, at least 4 wt. %, at least 5 wt. %, to at most 6 wt. %, at most 7 wt. %, at most 8 wt. %, at most 9 wt. %, at most 10 wt. %, or at most 15 wt. %, based on a total weight of the dewaterable composition.

The dewatering unit 116 receives the dewaterable composition from the second apparatus 112. The dewatering unit 116 dewaters the dewaterable composition to form a dewatered product 120 having a solids content that is greater than the solids content of the solids-containing liquid stream and a water stream 118 (e.g., filtrate). Suitable dewatering units may include, but are not limited to a clarifier, a gravity belt thickener, a rotary drum thickener, a dissolved air flotation system, a filtration system, a centrifuge, a belt filter press, a frame filter press, a screw press, any gravity-based dewatering unit, or a combination thereof.

In some embodiments, the dewatering unit 116 is a clarifier system. A clarifier system separates solids from a liquid stream using sedimentation within a settling tank. A flocculant is introduced to accelerate separation by promoting the formation of larger, denser flocs, thereby increasing the settling rate. Settled solids are typically removed via an underflow drainage system. Clarified liquid is typically removed via an overflow weir.

In some embodiments, the dewatering unit 116 is a gravity belt thickener. The gravity belt thickener is using a permeable belt to carry the flocculated sludge while the water is filtrated by gravity through the belt. Filtrated water and thickened sludge (slurry) are collected at the end of the process.

In some embodiments, the dewatering unit 116 is a rotary drum thickener. The rotary drum thickener is a porous drum containing the flocculated sludge and rotating slowly to allow the water to drain by gravity and the sludge to thicken.

In some embodiments, the dewatering unit 116 is a dissolved air flotation (DAF) system. The DAF system separates solids from a liquid stream by flotation, utilizing air bubbles. A flocculant is introduced to the system to promote floc formation. These flocs are separated from the liquid stream, at least in part, by air bubbles which increase the rise rate of the flocs through attachment and induced currents. Accumulated flocs are mechanically removed from the surface, and clarified water is discharged from the DAF tank. In some embodiments, the dewatering unit 116 is a filtration system. The filtration system is composed of a screen, a media or a membrane with pores of as low as 0.02 microns. Flocculating the sludge ahead of a filtration system results in improved removal efficiency and reduced filter clogging.

In some embodiments, the dewatering unit 116 is a centrifuge. The centrifuge uses centrifugal force to accelerate solid-liquid separation. The centrifuge typically includes a bowl that turns horizontally on its axis at high rotation speed (e.g., from 2500 to 3500 rpm) with a clarified water overflow. The particles are flattened against the bowl's sides in the clarification zone and are removed, for example, by an Archimedean screw. The rotation applies a centrifugal force on the solid particles that are then extracted quickly to produce the dewatered product 120. The clarified liquid called, centrate, is evacuated at the other end of the bowl by overflow via the water stream 118.

In some embodiments, the dewatering unit 116 is a belt filter press. The belt filter press dewaters sludge by pressing the dewaterable composition between two filter belts. The belts are configured to go through multiple compression zones, releasing more water each time by gravity. The water stream 118 is collected the bottom of the dewatering unit 116 while the dewatered product 120 (e.g., cake) is conveyed at this end of the belt filtration.

In some embodiments, the dewatering unit 116 is a frame filter press. The frame filter press is configured to dewater the dewaterable composition to a high level of dryness. The frame filter press includes a series of hollow vertical frames with filter cloths stretched on both sides. These frames are hung next to each other and pressed together with a hydraulic jack. A filter chamber is formed between the plates. The frame filter press may dewater the dewaterable composition in at least three phases, which include a filling phase, a filtration phase, and an opening phase. The filling phase includes injecting the dewaterable composition into the dewatering unit 116 by a high-pressure pump. The dewaterable composition fills each chamber and the water starts to seep out. Once all the chambers are filled, the filtration phase begins where the dewaterable composition continues to be pumped in and the pressure increases to reach up to 15 bars. The water stream 118 flows into the channels placed in each frame and is evacuated in a main pipe. The dewaterable composition injection flowrate reduces when the pressure increases. During the opening phase, several parameters may be used to signal the end of the cycle (stopping the injection pump): maximum pressure, filtration time, filtrate volume. Once the press has stopped, the central core is purged of the water stream 118 inside. The jack that presses the frames together is released. The chambers are opened sequentially, and the dewatered product (e.g., cake) falls below into a skip or on to a conveyor.

In some embodiments, the dewatering unit 116 is a screw press. The screw press is configured to press the dewaterable composition to dewater by conveying the dewaterable composition along the inside of a permeable cylinder. It is based on a slowly-rotating (~5 RPM) Archimedean screw within a cylindrical screen (otherwise termed drum filter/screen or basket). It is normally inclined by ~20° to the horizontal to assist with the draining of water stream 118 into the sump. The dewatered product 120 is pushed by the Achimedian screw to an outlet.

Figure 2:
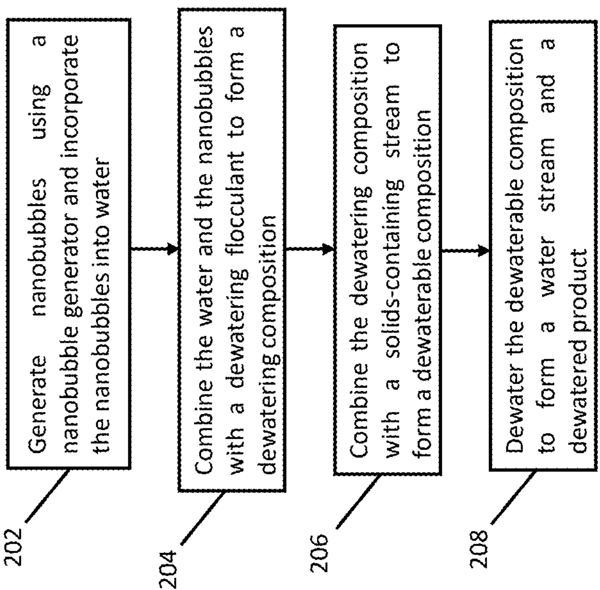
FIG. 2 is a schematic flowchart of a method.

Referring also to FIG. 2, a method 200 is provided for dewatering a solids-containing liquid stream from the wastewater source 114. At operation 202, the method 200 includes generating nanobubbles using the nanobubble generator 106. For example, at operation 202 the method may include transporting water from the water source 102 to the nanobubble generator 106, which generate the nanobubbles in the water received from the water source 102. For example, the nanobubble generator 106 may generate nanobubbles having a mean bubble size from at least 50 nm to no greater than 1000 nm. In some embodiments, the nanobubble generator 106 may generate nanobubbles having a zeta potential from at least −5 m V to no greater than −40 mV.

At operation 204, the method 200 includes combining the water, the nanobubbles, and the dewatering flocculant to form the dewatering composition. In some embodiments, operation 204 includes forming the dewatering composition in the blending apparatus 108. For example, the blending apparatus 108 may be configured to receive the dewatering flocculant from the flocculant source 110 and to receive nanobubble-containing water from the nanobubble generator 106. At operation 206, the method 200 includes combining the dewatering composition with the solids-containing liquid stream to form a dewaterable composition. In some embodiments, operation 206 includes forming the dewaterable composition in the second apparatus 112. For example, the second apparatus 112 may be configured to receive the dewatering composition from the blending apparatus 108 and to receive the dewaterable composition from the wastewater source 114.

At operation 208, the method 200 includes dewatering the dewaterable composition to form the water stream 118 and the dewatered product 120 having a solids content that is greater than the solids content of the solids-containing liquid stream. For example, the dewatering unit 116 may be configured to receive the dewaterable composition from the second apparatus 112 and to dewater the dewaterable composition to produce the water stream 118 and the dewatered product 120.

The provided system 100 and method 200 can be used in a variety of applications. In a first non-limiting example, the provided system 100 and method 200 can be utilized in the pulp and paper manufacturing process. The pulp and paper manufacturing process has a "wet end" that refers to the initial stage of a paper machine where a fiber suspension (e.g., pulp slurry) is dewatered and transformed into a continuous paper sheet by passing it through a wire mesh, essentially forming the basic structure of the paper while still containing a high moisture content. The provided system 100 and the method 200 may be used to dewater the pulp slurry in the pulp and paper manufacturing process. Polymers are primarily used as "wet-strength agents" to enhance the strength of paper when wet, particularly by creating crosslinks between cellulose fibers within the paper pulp, ensuring the paper maintains its integrity even when exposed to moisture; common polymer types used for this purpose include polyamideamine epichlorohydrin (PAE), polyacrylamide (PAM), and cationic starch. Polymer is injected into the pulp slurry ahead of the wire mesh process.

In a second non-limiting example, the provided system 100 and method 200 can be used in mining or froth floatation. Froth flotation is a process that separates materials by their hydrophobicity or water repellence. It's commonly used in mining to separate valuable minerals from waste (e.g., tailings). An ore/water mixture (e.g., slurry) is pumped to the floatation cell. Prior to the floatation cell, chemicals such as polymers are added to make the desired mineral particles hydrophobic and capturable through floatation in the floatation cell. Air bubbles are then introduced into the mixture in the floatation cell. The air bubbles attach to the hydrophobic particles to form a froth. The froth is removed, which leaves the hydrophilic materials in the liquid phase. Common chemicals used in froth flotation include collectors like xanthate salts (e.g., potassium ethyl xanthate, potassium isobutyl xanthate), frothers like pine oil, methyl isobutyl carbinol (MIBC), and cresylic acid, and depressants like sodium cyanide or dichromate; depending on the specific ore being processed, additional modifiers and activators may also be used to optimize the separation process. In copper froth flotation, the most common polymer used is polyacrylamide (PAM), often employed as a depressant to selectively inhibit the flotation of unwanted minerals while allowing the copper sulfide particles to float freely with the air bubbles; other polymers may include modified forms of cellulose like sodium carboxymethyl cellulose (CMC) depending on the specific ore composition and desired separation goals. The residual sludge, or tailings, may be further processed to reduce moisture and mineral content using the provided system 100 and method 200. In the tailings process, polymer is typically added directly into the tailings slurry (e.g., sludge), either in a mixing tank or through injection into the pipeline just before the tailings discharge point, allowing turbulence to mix the polymer solution thoroughly with the slurry. This ensures the polymer is evenly distributed throughout the tailings stream to facilitate particle aggregation and improve dewatering efficiency.

In a third non-limiting example, the provided system 100 and method 200 can be used in a dredging process. Dredging is the process of removing soil and rock (e.g., sludge) from underwater areas using specialized equipment called dredges. Dredging is performed for a variety of reasons, including navigation, flood control, and environmental restoration. Dredging slurry dewatering is the process of removing water from dredged materials. It's a key step in dredging because it reduces the volume and weight of the material, making it easier to transport and dispose of. Mechanical mechanisms of dewatering may be used, such as belt presses, plate presses and hydrocyclones. Gravity mechanisms to dewater may include the use of geotextile tubes (geotubes) and rely on gravity to naturally dewater the sludge (the slurry remains trapped, while the water is able to escape the geotextile). The provided system 100 and method 200 may be used to dewater the slurry. Dredging slurry dewatering uses polymers like anionic polymers, cationic polymers, and polyacrylamide copolymers. These polymers help separate solids from liquids, reduce sludge volume, and speed up dewatering of the sludge and are added to the sludge mixture immediately prior to the dewatering mechanism.

EXAMPLES

Example 1

Digested sludge was sampled from a California wastewater facility and a flocculant (polymer) used for dewatering was selected as well. The sludge was diluted 1:1 with DI water or NB water like in Tianfeng Wang et al. study (see, "Synchronous improvement of methane production and digestate dewaterability in sludge anaerobic digestion by nanobubble," Bioresource Technology, 2024) and a simplified Buchner funnel-type vacuum filtration test was done to evaluate the filterability of the sludge like in Yihon Li et al. study (see, "Effect of Bulk Nanobubbles on the Flocculation and Filtration Characteristics of Kaolin Using Cationic Polyacrylamide (CPAM)," Minerals, 2024). The flocculant solutions were prepared either with or without nanobubble water before being added to the sludge (2 mL of raw flocculant into 498 mL of water). 3 mL of diluted flocculant was added to 100 mL of diluted sludge in all tests to form the flocs before filtration using the Buchner funnel vacuum system.

Figure 3:
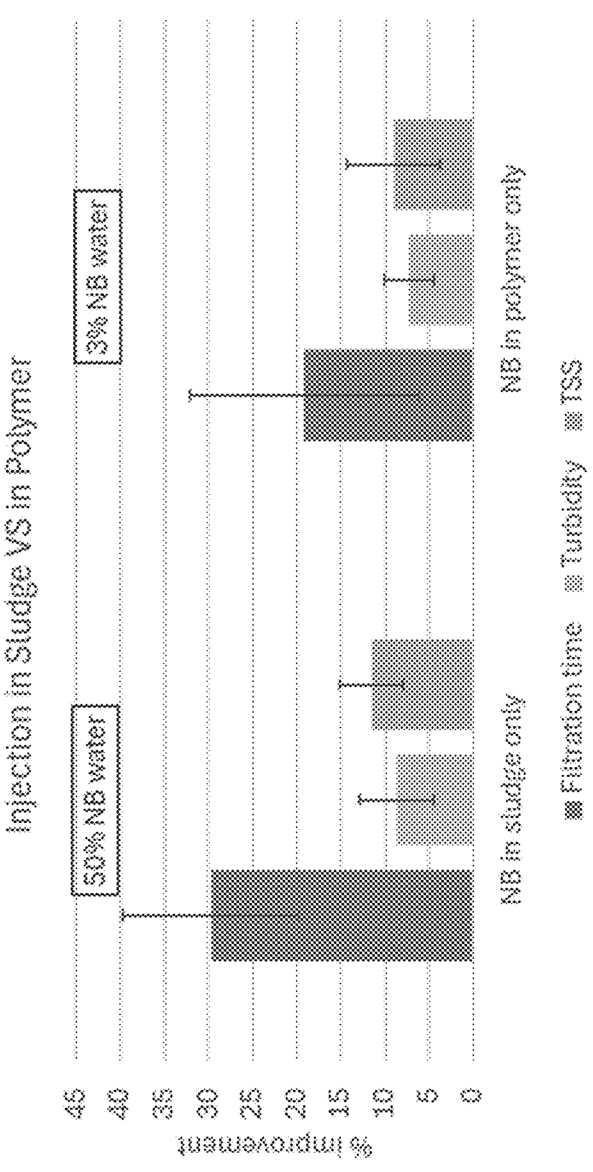
FIG. 3 is a graph illustrating an improvement of filtration time, turbidity, and Total Suspended Solid (TSS) relative to a control for nanobubbles added in sludge or in the dewatering flocculant.

The control test (no nanobubble in the sludge or in the flocculant) was used to evaluate the improvement with nanobubble addition either in the flocculant dilution or in the sludge. The time to filtrate 50 mL of the floc has been recorded as well as the Total Suspended Solid (TSS) and the turbidity of the filtrated water. These three measurements showed an improvement with the addition of nanobubbles, which includes: a faster filtration time, a lower turbidity and lower TSS—indicating a stronger floc formation, more water release and more trapped particles. The improvement is shown in FIG. 3, which compares each measurement to the control. All tests have been achieved using the same digested sludge and repeated 3 times within 3 hours on the same day.

Considering the results shown in FIG. 3, it is concluded that injecting nanobubbles in the sludge or in the flocculant unexpectedly will allow similar filterability improvements whether the volume of nanobubble water in the whole system represents 50% when nanobubbles are injected into the sludge or 3% when nanobubbles are injected into the flocculant dilution. The test results confirm that even though adding nanobubble water into the flocculant dilution results in 16.67× less nanobubble water, the efficacy to improve dewatering applications is the same as adding directly to the much higher volume sludge. This confirmed the ability to reduce capital costs by adding less nanobubble water in the system to obtain the same results. Aspects of the present disclosure provide a feasible way of incorporating nanobubbles into the dewatering process without having to inject nanobubbles directly into the liquid-solid stream to achieve similar dewatering performance, while reducing capital costs, maintenance costs, and operational costs associated with direct nanobubble injection into the liquid-solid stream, as discussed above. With the methods provided herein, nanobubbles can improve the dewatering process performance by either reducing flocculant usage, decreasing moisture of the cake, or improving the filtrate water quality.

What is claimed is:

1. A dewatering method comprising:

(a) combining water, a dewatering flocculant, and nanobubbles to form a dewatering composition;

(b) combining the dewatering composition with a solids-containing liquid stream to form a dewaterable composition; and (c) dewatering the dewaterable composition to form a water stream and a dewatered product having a solids content that is greater than the solids content of the solids-containing liquid stream.

2. The dewatering method according to claim 1, wherein the solids-containing liquid stream comprises a biomass stream.

3. The dewatering method according to claim 1, wherein the solids-containing liquid stream is a sludge stream selected from the group consisting of wastewater sludge, oily sludge, mineral sludge, natural sludge, ash sludge, and combinations thereof.

4. The dewatering method according to claim 1, wherein the solids-containing liquid stream is a pulp stream selected from the group consisting of paper pulp, food pulp, and combinations thereof.

5. The dewatering method according to claim 1, wherein the solids-containing liquid stream has a solids content of at least 0.5 g/L, at least 1.0 g/L, at least 1.5 g/L, at least 2.5 g/L, at least 5 g/L, at least 7 g/L, or at least 10 g/L.

6. The dewatering method according to claim 1, wherein the solids-containing liquid stream has a solids content of at least 7 g/L.

7. The dewatering method according to claim 1, wherein the dewatering flocculant comprises a dewatering polymer.

8. The dewatering method according to claim 7, wherein the dewatering polymer comprises a cationic polymer.

9. The dewatering method according to claim 7, wherein the dewatering polymer is selected from the group consisting of polyacrylamide, polyethyleneamine, polyethyleneimine, cationic starch, melamine-formaldehyde polymer, polyamine, and combinations thereof.

10. The dewatering method according to claim 1, wherein the dewatering flocculant is selected from the group consisting of lime, iron salt, aluminum salt, and combinations thereof.

11. The dewatering method according to claim 1, wherein the nanobubble concentration in the dewatering composition is at least $1\times10^{6}$ nanobubbles/ml.

12. A system comprising:

a blending apparatus configured to receive a dewatering flocculant and water containing nanobubbles, wherein the blending apparatus is configured to combine the water, the dewatering flocculant, and the nanobubbles to form a dewatering composition;

a second apparatus configured to receive a solids-containing liquid stream and the dewatering composition, wherein the second apparatus is configured to combine the solids-containing liquid stream and the dewatering composition to form a dewaterable composition; and a dewatering unit configured to receive the dewaterable composition, wherein the dewatering unit is configured to dewater the dewaterable composition to form a water stream and a dewatered product having a solids content that is greater than the solids content of the solids-containing liquid stream.

13. The system of claim 12 further comprising:

a nanobubble generator configured to receive the water, wherein the nanobubble generator is configured to generate the nanobubbles and incorporate the nanobubbles into the water; and wherein the blending apparatus is configured to receive the water and the nanobubbles from the nanobubble generator.

14. The system of claim 12, wherein the dewatering unit is selected from the group consisting of a clarifier, a gravity belt thickener, a rotary drum thickener, a dissolved air flotation system, a filtration system, a centrifuge, a belt filter press, a frame filter press, a screw press, and a combination thereof.

15. The system of claim 12, wherein the second apparatus receives the solids-containing liquid stream, and wherein the solids containing liquid stream comprises a biomass stream.

16. The system of claim 12, wherein the second apparatus receives the solids containing liquid stream, and wherein the solids containing liquid stream comprises a sludge stream selected from the group consisting of wastewater sludge, oily sludge, mineral sludge, natural sludge, ash sludge, and combinations thereof.

17. The system of claim 12, wherein the second apparatus receives the solids containing liquid stream, and wherein the solids containing liquid stream is a pulp stream selected from the group consisting of paper pulp, food pulp, and combinations thereof.

18. The system of claim 12, wherein the second apparatus receives the solids containing liquid stream, and wherein the solids containing liquid stream has a solids content of at least 0.5 g/L, at least 1.0 g/L, at least 1.5 g/L, at least 2.5 g/L, at least 5 g/L, at least 7 g/L, or at least 10 g/L.

19. The system of claim 12, wherein the second apparatus receives the solids containing liquid stream, and wherein the solids containing liquid stream has a solids content of at least 7 g/L.

20. The system of claim 12, wherein the second apparatus receives the dewatering composition, and wherein the dewatering flocculant comprises a dewatering polymer.

21. The system of claim 20, wherein the dewatering polymer comprises a cationic polymer.

22. The system of claim 20, wherein the dewatering polymer is selected from the group consisting of polyacrylamide, polyethyleneamine, polyethyleneimine, cationic starch, melamine-formaldehyde polymer, polyamine, and combinations thereof.

23. The system of claim 12, wherein the second apparatus receives the dewatering composition, and wherein the dewatering flocculant is selected from the group consisting of lime, iron salt, aluminum salt, and combinations thereof.

24. The system of claim 12, wherein the nanobubble concentration in the dewatering composition is at least $1\times10^{6}$ nanobubbles/mL.

25. The system of claim 12, wherein the dewatering unit is a gravity-based dewatering unit.

26. A method comprising:

(a) combining a liquid, a liquid-removing flocculant, and nanobubbles to form a first composition;

(b) combining the first composition with a solids-containing liquid stream to form a second composition; and (c) removing liquid from the second composition to form a liquid stream and a product having a solids content that is greater than the solids content of the solids-containing liquid stream.

* * * * *